United States Patent [19]

van der Berg et al.

[11] Patent Number: 5,390,627
[45] Date of Patent: Feb. 21, 1995

[54] METHOD OF CLEANING TEAT CUPS AND/OR AFTER-TREATING THE TEATS OF A MILKED ANIMAL, AN IMPLEMENT FOR MILKING ANIMALS APPLYING SAID METHOD(S), AND A CLEANING DEVICE APPLIED IN SUCH AN IMPLEMENT

[75] Inventors: Karel van der Berg, Bleskengraaf; Rene Fransen, Vlaardingen, both of Netherlands

[73] Assignee: C. van der Lely, N.V., Massland, Netherlands

[21] Appl. No.: 70,936

[22] Filed: Jun. 4, 1993

[51] Int. Cl.$^6$ .............................................. A01J 5/04
[52] U.S. Cl. ................................ 119/14.08; 119/14.18
[58] Field of Search ................ 119/14.02, 14.08, 14.1, 119/14.18, 158

[56] References Cited

U.S. PATENT DOCUMENTS

| | | | |
|---|---|---|---|
| 2,213,069 | 8/1940 | Engels et al. | 119/14.18 X |
| 2,558,628 | 6/1951 | Redin | 134/95 |
| 2,624,355 | 1/1953 | Buchinger | 134/168 |
| 3,012,566 | 12/1961 | Baker | 134/153 |
| 3,310,061 | 3/1967 | Bender | 119/14.18 X |
| 3,385,265 | 5/1968 | Schrader | 119/14.18 |
| 4,010,714 | 3/1977 | Notsuki et al. | 119/14.03 |
| 4,580,527 | 4/1986 | Bücker | 119/14.18 |
| 4,924,809 | 5/1990 | Verbrugge | 119/14.02 |
| 4,936,255 | 6/1990 | Pera | 119/14.08 |

FOREIGN PATENT DOCUMENTS

| | | |
|---|---|---|
| 21401/83 | 4/1987 | Australia . |
| 0306579 | 3/1989 | European Pat. Off. . |
| 0309036 | 3/1989 | European Pat. Off. . |
| 0320496 | 6/1989 | European Pat. Off. . |
| 0323444 | 7/1989 | European Pat. Off. . |
| 0332231 | 9/1989 | European Pat. Off. . |
| 0385539 | 9/1990 | European Pat. Off. . |
| 0476771 | 3/1992 | European Pat. Off. . |
| 2159370 | 6/1973 | France . |
| 2559351 | 8/1985 | France . |

*Primary Examiner*—Robert P. Swiatek
*Attorney, Agent, or Firm*—Penrose Lucas Albright

[57] ABSTRACT

An apparatus and method for automatically cleaning the teat cups of a milking apparatus. The teat cups are automatically removed by a robot arm from the animal's teats. Nozzles are provided which are automatically inserted into the openings for the teats located on top of the teat cups. In the cleaning operation, the nozzles are, in effect, connected to the teat cups and spray a cleansing and/or rinsing liquid through an upper set of outlets from the nozzle to clean the upper surfaces of the teat cups and through a lower set of nozzle outlets to clean and rinse the interior of the teat cups as well as the lines connected therewith. Associated with the nozzles are rotatable cleaning members for cleaning the animals' teats and udders in the vicinity thereof. Brushes and spray nozzles are provided for automatically cleaning these cleaning members after use. All operations are programmed to occur automatically without human assistance or intervention.

49 Claims, 8 Drawing Sheets

METHOD OF CLEANING TEAT CUPS AND/OR AFTER-TREATING THE TEATS OF A MILKED ANIMAL, AN IMPLEMENT FOR MILKING ANIMALS APPLYING SAID METHOD(S), AND A CLEANING DEVICE APPLIED IN SUCH AN IMPLEMENT

BACKGROUND OF THE INVENTION

The present invention relates to a method of automatically cleaning teat cups in an implement for milking animals, such as cows. For hygienic reasons because of quality requirements imposed on milk, effective cleaning the teat cups is important. It is especially important for dirt to be removed from the exterior of the teat cups and more particularly from the upper sides thereof, since these sides come into contact with the udders of the animals.

SUMMARY OF THE INVENTION

According to the invention, the method of cleaning teat cups in an implement for milking animals, such as cows, is characterized in that, after milking an animal, the teat cups are removed from the animal's teats and cleaned automatically with a cleaning device. Since the teat cups can easily be contaminated by each cow, a rinsing liquid is discharged across the upper side of the teat cups. In other words, cleaning the exterior of the teat cups at the upper side is effected after each milking run. To clean the interior of the teat cups and the milking lines connected thereto a different method is used. According to the invention, if after milking an animal the milking parlor is not then entered by another animal to be milked, a rinsing liquid is flushed through the teat cups and the milking lines connected thereto. Bacterial action is prevented by flushing before milk remaining in the teat cups and lines connected thereto has dried. The rate of drying depends upon the outside temperature. In any case, it is desirable to flush the teat cups and the lines connected thereto every time the milking parlor is not entered by another animal to be milked within a predetermined period of time. This predetermined period of time is preferably in the order of five minutes but may be as long as about an hour after a previous animal has been milked. In a particular method in accordance with the invention, the rinsing liquid is passed via separate channels over the upper side of the teat cups and into the teat cups with the milking lines connected thereto, respectively. This makes it possible to rinse the exterior of the teat cups independently of the cleaning of their interiors which receive the animals' teats and the milking lines connected thereto.

When milking, milk from the animals is conveyed from the teat cups and the milking lines connected thereto to a milk tank. A three-way valve is incorporated in an advantageously selected location in the milking lines. The three-way valve allows the milk conduit between a teat cup and the milk tank to be interrupted so that fluid flowing therein is diverted to a liquid material reservoir. It is then possible to circulate rinsing liquid received in this liquid material reservoir to the spray nozzles and from there through the teat cups which have been incorporated in the rinsing liquid circuit, next through the relevant milking lines connected thereto, and finally through the said three-way valve back to the liquid material reservoir. Thus, the teat cups and the milk lines connected thereto are flushed, and the residual milk in the teat cups and in the milk lines connected thereto is removed. Such a combined rinsing line and milk line system is disclosed in European Patent Application No. 0 385 539 of van der Lely, published Sep. 5, 1990.

The invention not only relates to a method of cleaning teat cups but also relates to an apparatus for milking animals which provides a cleaning device for teat cups. The method in accordance with the invention can be applied with the cleaning device disclosed herein. This apparatus is provided with a rinsing liquid circuit that includes spray nozzles. The end of a teat cup, which is incorporated in the rinsing liquid circuit, is adapted for receiving the spray nozzles. Each of the spray nozzles has one or more of flow-out apertures, through which a rinsing liquid is conducted over the upper sides of the teat cups connected thereto.

An important feature is that not only are the exterior upper sides of the cups cleaned, inasmuch as these upper sides come into contact with the animal's udder, but the interior surfaces that contact the animals' teats are also cleaned. According to the invention, the implement is therefore characterized in that each of the spray nozzles of the cleaning device is provided with one or more first flow-out apertures, through which rinsing liquid from the spray nozzles is discharged into the teat cups connected to the spray nozzles. A second flow-out aperture is provided, through which rinsing liquid is discharged over the upper surface of the teat cups connected thereto. In a preferred embodiment, separate ducts have been provided in the spray nozzles for rinsing liquid from different sources to be received through the first and second flow-out apertures. This makes it possible to rinse the interiors of the teat cups independently of cleaning their exteriors and, more specifically, independently of cleaning of the upper surfaces of the teat cups. In addition, it is possible to apply different pressures to discharge the rinsing liquid through the separate flow-out apertures. The second flow-out aperture is preferably annular to effect an adequate cleaning of the upper side of a teat cup. In this situation, the second flow-out aperture is more particularly located in a plane perpendicular to the longitudinal axis of a spray nozzle and teat cup connected thereto. In a preferred embodiment, the second flow-out aperture is disposed in the spray nozzle so that, when a vacuum is applied in a connected teat cup in order to effect a connection with and cause the test cup to move upwardly relative to the spray nozzle, the second flow-out aperture is closed, assuming at least no liquid pressure is present in the duct leading to this flow-out aperture. The first flow-out apertures can then be arranged in a spray nozzle so that, when a teat cup is connected thereto, the first flow-out apertures are located directly below the upper edge of the teat cup. In a preferred embodiment, the spacing between the first and the second flow-out apertures is approximately five to ten millimeters.

In a further preferred embodiment according to the invention, the cleaning device of the apparatus is provided with a carrier element, to which the spray nozzles are connected. In accordance with another feature of the invention, the carrier element has ducts through which rinsing liquids are introduced into the spray nozzles. According to yet another feature of the invention, the carrier element has a first duct system through which the rinsing liquid from one source flows to the first flow-out apertures of the spray nozzles and a second duct system through which the rinsing liquid from a different source flows to the second flow-out apertures of the spray nozzles. Consequentially, only two supply lines for rinsing liquid needs be connected to the device and it is not necessary for each of the flow-out apertures of the spray nozzles have a separate supply line whereby a highly compact construction for the cleaning device is possible. A screen can be provided around the cleaning device or around the individual spray nozzles in a manner to cover the upper ends of the connected teat cups thereby preventing the rinsing liquid from being discharged beyond the upper surfaces of teat cups connected thereto if sprayed excessively from the second flow-out aperture connected thereto in lateral directions.

Rinsing the teat cups is especially important during the automated milking of animals. In accordance with a further feature of the invention, the cleaning device is connected to a milking robot which forms part of the implement for milking animals. The cleaning device may then be secured to the milking robot in such a position that, when the milking robot is not operative for milking, the teat cups mounted on a robot arm forming part of the milking robot, can be connected to the cleaning device by an upward movement of the robot arm.

In another embodiment according to the invention, the apparatus is provided with a cleaning member for cleaning the teats of an animal to be milked and thus the apparatus has a multi-functional character, since it can clean both the teat cups and the animal's teats. According to a further feature of the invention, the apparatus includes a cleaning system for cleaning the cleaning member. Using the cleaning system, it is possible, after cleaning the teats of the animal by the cleaning member, to clean the cleaning member itself, so that the next animal to be milked will be cleaned by the cleaning member under highly hygienic conditions. Operating under these conditions contributes to a relatively low somatic cell count of the milk and to an extremely low risk of infection by, for example, mastitis between the animals.

In accordance with a yet further feature of the invention, the cleaning system comprises a box-like housing having a slot, through which the cleaning elements of the cleaning member are inserted. After completion of cleaning the teats, the cleaning elements are stored in the box-like housing. In accordance with a still further feature of the invention, the box-like housing contains one or a plurality of rinsing members. The rinsing member introduces rinsing liquid into the box-like housing, as well as to one or a plurality of brushes. During cleaning of the cleaning elements in the box-like housing, rinsing liquid is sprayed against the cleaning elements, while at the same time the cleaning elements rotate against the brushes.

In order to effect a proper positioning of the cleaning device and the cleaning member in the box-like housing, the box-like housing is provided with a positioning mechanism which also serves as a retention element. The positioning mechanism provides that the cleaning device and cleaning member are brought into and maintained in a pre-determined position relative to the box-like housing each time they are stored therein. Thus, when applied to a milking robot, the positions of the cleaning device and cleaning member are relatively simple to define, so that an arm of the milking robot is able to retrace the paths of the cleaning device and cleaning member to the same positions on each occasion of use.

The apparatus may include a milking parlor having on at least one of its longitudinal sides a fixed frame including a first, upper frame portion to which is attached a milking robot for the automatic milking of animals. It may also include a second, lower frame portion, against which the milking robot bears and along the underside of which the milking robot's arms are positioned under the animal in the milking parlor. Furthermore, the milking robot may include a carrier frame for further parts of the milking robot, the carrier frame being movable along the upper frame portion. In this manner, the cleaning device may be secured to the carrier frame of the milking robot. More specifically, the further parts of the milking robot may include a robot arm, on which teat cups are mounted. The cleaning device or cleaning members are connected to the carrier frame so that, when the milking robot is not operative for milking, the teat cups can be caused to engage cleaning device by an upward movement. Consequently according to a still further feature of the invention, the mutual spacing between the teat cups corresponds to that between the spray nozzles of the cleaning device.

In a preferred embodiment according to the invention, the robot arm includes an after-treatment device for treating the udder and/or the teats of an animal after milking.

More specifically, the invention also relates to an apparatus for automatically milking animals, such as cows, which includes an after-treatment device for automatically destroying, neutralizing or inhibiting the growth of pathogenic microorganisms on the udder and/or the teats of a milked animal to reduce the likelihood that the animal will become infected. The after treatment device includes a spray nozzle, the supply line thereto containing a valve near the spray nozzle. As a result, on opening of the valve, the occurrence of initial and final phenomena relating to the commencement of termination of the liquid supply to the spray nozzle is prevented, so that almost immediately after the valve has been opened a preferably fan-shaped spray pattern is produced by the spray nozzle. In a preferred embodiment according to the invention, the spray nozzle is arranged at the outer end of a milking robot between two teat cups at the end of the robot arm. Thus after the automatic milking, the animal's udder and/or teats can be disinfected without human intervention.

According to a still further feature of the invention, the spray nozzle is arranged at or near the end of an arm of a milking robot for the automatic milking of animals so that, relative to such end, a forwardly and upwardly directed fan-shaped spray pattern is provided. According to a yet further feature of the invention, this fan-shaped pattern extends at an angle in the range between ten and fifty degrees relative to a vertical plane through the front teat cups. Because the fan-shaped pattern is directed forwardly and upwardly, liquid is prevented from falling into the teat cups during the spraying of the udder and/or the teats.

The invention, furthermore relates to a method of after-treatment of the milked animal's teats in an apparatus for the automatic milking of animals. After the animal has been milked, the teat cups are disconnected from the animal's teats and an after-treatment liquid is sprayed automatically against the udder and/or the teats. Thus, after each milking run, without human intervention, the udder and/or the teats of the milked animal are disinfected automatically. This is beneficial to the animal's hygiene and health. The invention also relates to a method wherein the after-treatment liquid is sprayed in a fan-shaped pattern while being moved along under the udder in a direction corresponding to that extending from the plane of the fan-shaped pattern to the teat cups. By thus treating the udder and/or teats with the after-treatment liquid, such liquid does not drip into the teat cups because they are moving away from the sprayed surfaces.

The invention not only relates to an apparatus for milking animals which is provided with a cleaning device as described in the present application, but also relates to a cleaning device as applied by this implement and/or as applied in a method disclosed in the present application.

For a better understanding of the invention and to show how the same may be carried into effect, reference is now made, by way of example, to the embodiments shown in the accompanying drawings:

DESCRIPTION OF THE PREFERRED EMBODIMENTS

Figure 1:
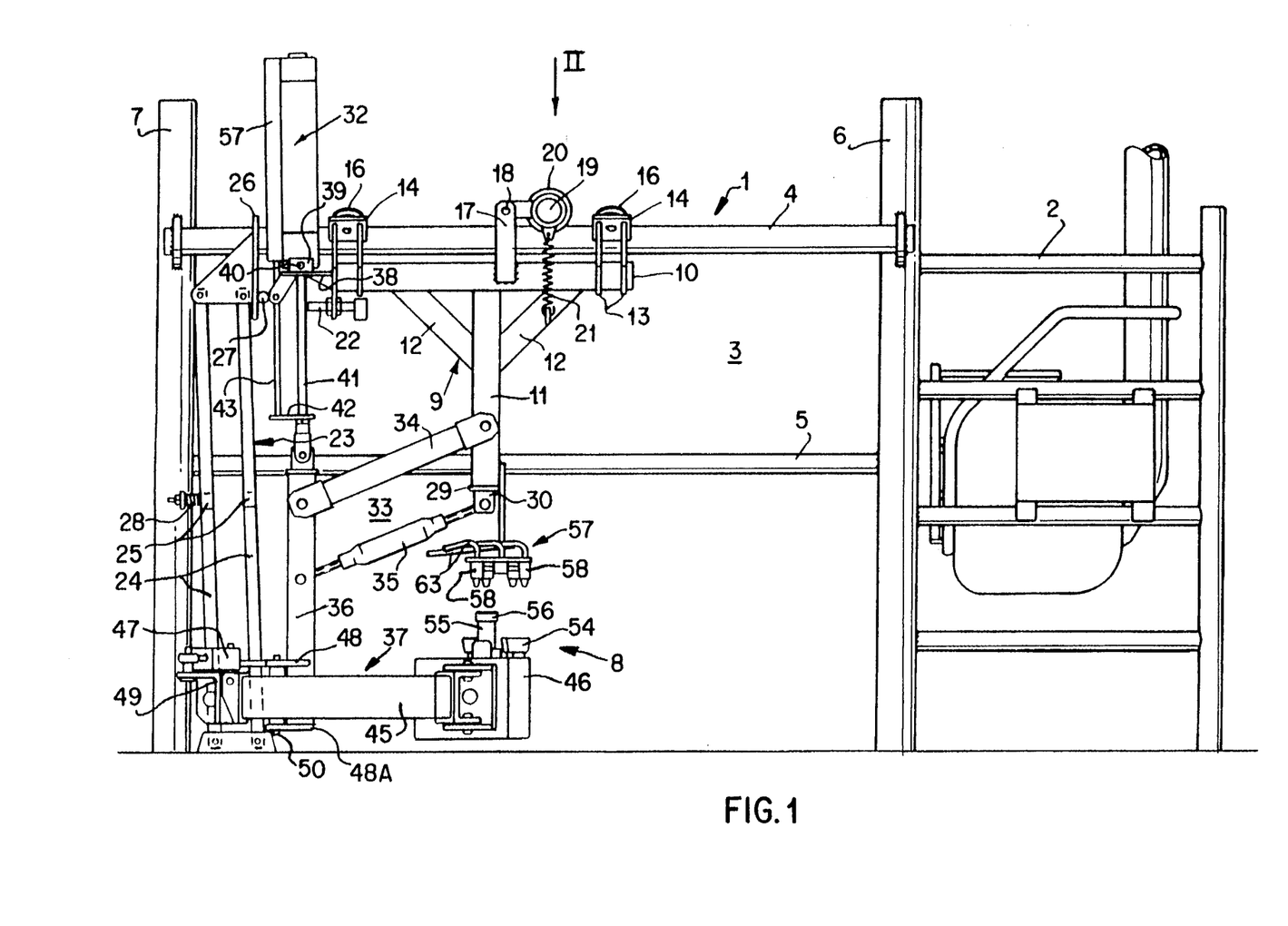
FIG. 1 is a side elevational view of an apparatus for automatic milking of animals, in which the cleaning device of the invention is incorporated.
Figure 2:
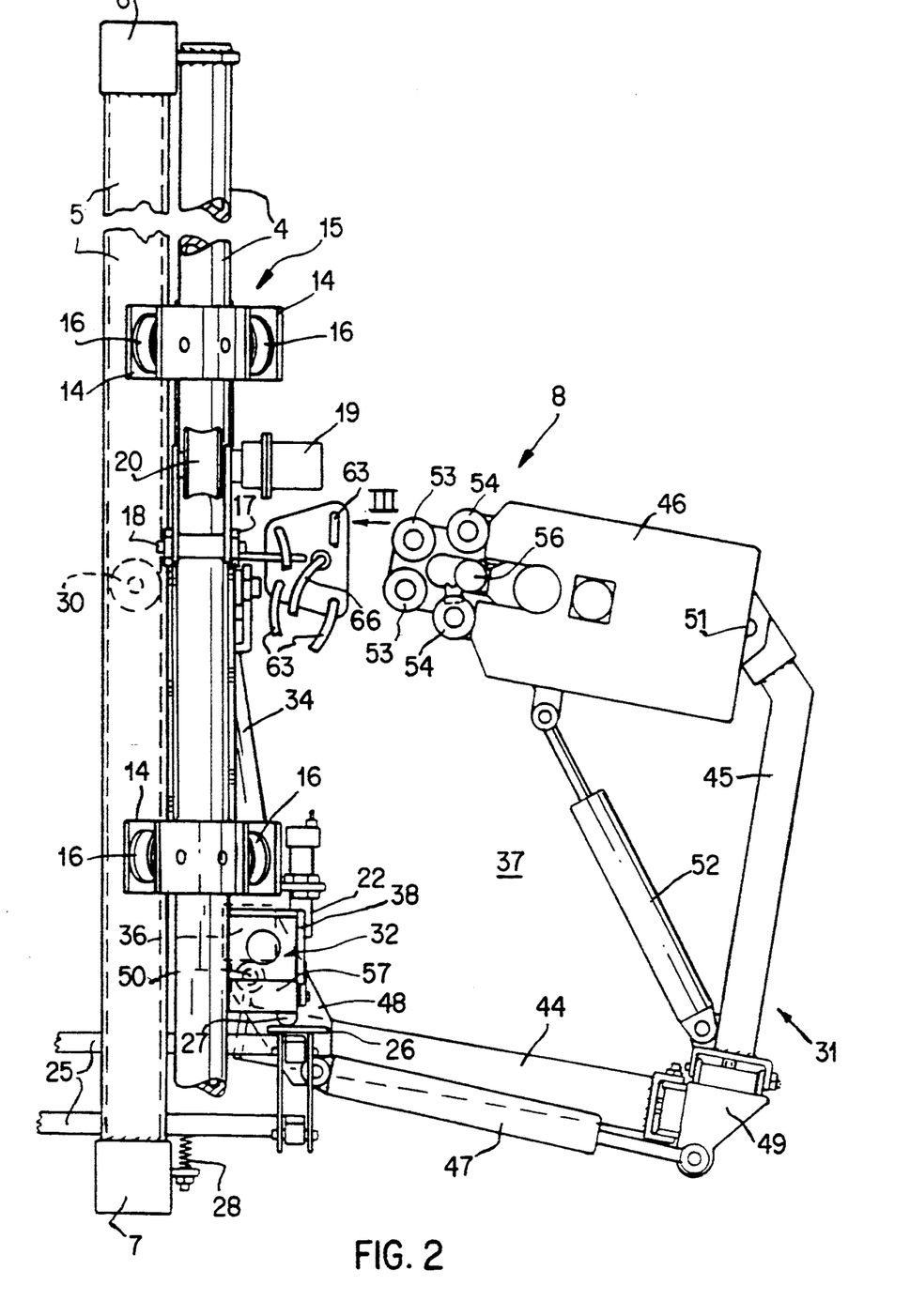
FIG. 2 is a plan view of a portion of the apparatus including the cleaning device shown in FIG. 1.
Figure 3:
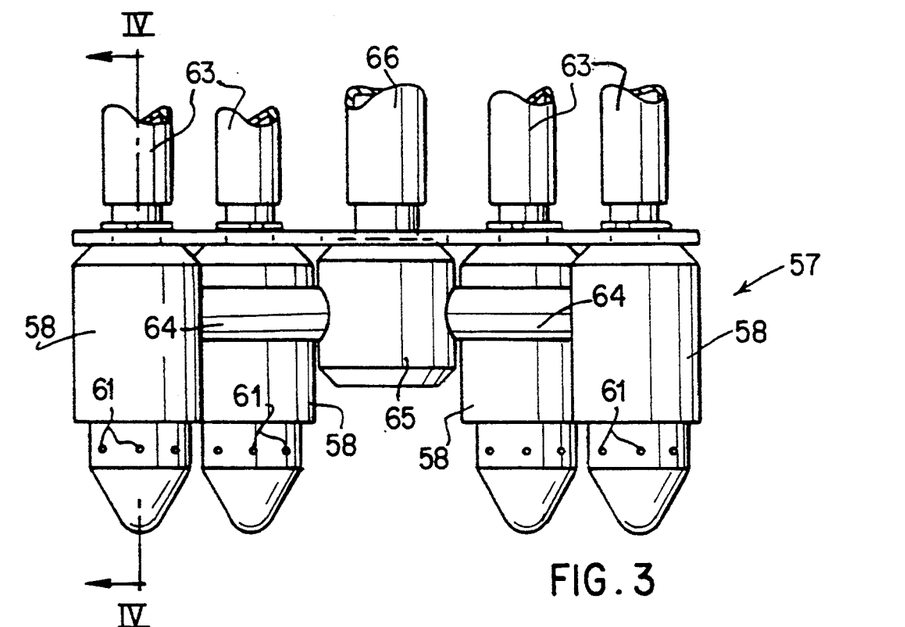
FIG. 3 is a side elevational view of the spray nozzles of the cleaning device in accordance with the invention.

The apparatus illustrated in FIGS. 1 and 2 includes a milking parlor 1 surrounded by a railing 2 which allows an animal in parlor 1 a limited freedom of movement. The animal can enter the milking parlor from the lateral side at the rear and leave from the forward side. The front of the milking parlor is provided with a feeding plant, and the cow upon advancing sufficiently far within the parlor to the feeding plant is in a position to be easily milked. At a longitudinal side of the milking parlor, in contrast to wherein the entrance and exit are located, is a fixed frame 3 which forms parts of railing 2. Fixed frame 3 includes a first frame portion 4 and a second frame portion 5. First frame portion 4 extends parallel to and is located predominantly over second frame portions 5. In this configuration, first frame portion 4 is rigidly connected to the exterior side of two vertical posts 6 and 7 which form part of railing 2 wherein second frame portion 5 is rigidly fitted between these two posts 6 and 7. A milking robot designated generally by reference numeral 8 for the automatic milking of animals is movably connected to first frame portion 4. This milking robot bears against second frame portion 5, which is provided at a height whereby arms of milking robot 8 can be moved along its underside to under the cow present in the milking parlor. Milking robot 8 includes a carrier frame 9 for additional portions of the milking robot. By using upper frame portion 4 as a rail, carrier frame 9 and consequently the entire milking robot 8 is easily moved along this frame portion. Carrier frame 9 includes a horizontal beam 10 which extends substantially parallel to first frame portion 4. A pillar 11 extends perpendicular to carrier frame 9 in a vertical downward direction and is rigidly secured thereto with two struts 12. Pairs of supporting elements 13 are located near the ends of beam 10. Connected to each pair of supporting elements 13 at an angle of approximately 45°, with the aid of supporting plates rigidly connected thereto, are two rollers 16 forming a roller element pair 15. Roller element pair 15 is arranged so that carrier frame 9 is suspended from upper frame portion 4 wherein it is easily movable therealong. Two carriers 17 are provided at either side of the beam 10 of carrier frame 9. A motor 19 is attached to these carriers wherein it is movable about a pivot shaft 18. This motor 19 drives a roller 20 which preferably has a rubber surface. Roller 20 is urged by a spring member 21 against the upper frame portion 4. Inasmuch as spring member 21 is in tension between motor 19 and carrier frame 9, the roller which is driven by motor 19 is retained by the force exerted by spring 21 against upper frame portion 4. Therefore, when the motor is driven, it is moved lengthwise along the upper frame portion 4 and consequently carries with it the entire carrier frame 9.

A sensor 22, which for example comprises a laser, is connected to supporting element 13 which, taken in a direction from the milking parlor, is the rearmost supporting element. With the aid of this sensor 22 it is possible to move the milking robot from a rest position in the longitudinal direction of the milking parlor to a starting position, in which the arms of the milking robot are moved under the animal present in the milking parlor. It is also possible to follow the motions of the animals in the longitudinal direction of the milking parlor. For that purpose, sensor 22 cooperates with a supporting element 23 which is movable against the rear side of the animal. With the aid of a rod system, which in the present embodiment consists of a quadrangular structure, and more particularly a parallelogram structure 24, supporting element 23 is pivotal relative to the milking parlor floor. A plate 26 is mounted on two rods 25 of supporting element 23. Plate 26 is positioned laterally outside frame portions 4 and 5 and is constructed and arranged so that it can reflect a signal transmitted by sensor 22. After sensor 22 has detected the reflected signal, it produces a control signal which is a measure of the actual (i.e. the measured), distance between plate 26 and sensor 22. The control signal causes motor 19 to be driven, whereby milking robot 8 is moved in the longitudinal direction of the milking parlor so that the distance between plate 26 and sensor 22 is brought to and maintained at, respectively, a preset value. Milking robot 8, in its rest or inactive position, is disposed as far as possible to the rear relative to frame portions 4 and 5. In this position, milking robot 8 engages, via a contact element 27, plate 26 and thus maintains supporting element 23 in its rearmost position. In other words, supporting element 23 is held rearwardly by milking robot 8 when the robot is in the rest position. When the milking robot is moved from its rest position in the longitudinal direction of the milking parlor to its starting position, whereby the arms of the milking robot are moved under the animal in the milking parlor, then supporting element 23 is released and urged by the resilient action of a spring 28 located between parallelogram structure 24 and post 7 against the rear side of the cow then in the milking parlor. As the cow moves forwardly or rearwardly, supporting element 23 continues to be urged against the rear side of the animal by the pressure exerted by compression spring 28. Thus, the position of plate 26 is determined by the position of the animal in the milking parlor in the longitudinal direction. Sensor 22, while maintaining a constant distance in longitudinal direction between plate 26 and sensor 22, causes the milking robot to conform to the cow's movements in the longitudinal direction within the milking parlor.

In the present embodiment, pillar 11 of carrier frame 9 extends vertically downwardly to slightly below second frame portion 5. At the bottom side of this pillar 11 there is a horizontal, rearwardly extending strip 29, on which is freely rotatable roller element 30. Lower frame portion 5 comprises a rail and more specifically a rail in the form of a U-shaped beam. Freely rotatable roller element 30 is arranged so it is movable between the two upright edges of the U-shaped beam. Thus, milking robot 8 bears against lower frame portion 5 and, in this position, moves smoothly along second frame portion 5, when milking robot 8 is moved by the motor along first frame portion 4. In addition to carrier frame 9, the milking robot includes a robot arm construction 31 which is predominantly movable in the vertical direction relative to carrier frame 9 with the aid of an operating cylinder 32. Robot arm construction 31 is movably connected to carrier frame 9 by means of a quadrangular structure 33. In the embodiment shown, an upper arm 34 of quadrangular structure 33 is of a fixed length, whereas the lower arm 35 has an adjustable length. This allows the orientation of the robot arm construction 31 to be adjusted to a limited extent. Robot arm construction 31 comprises a predominantly vertical robot arm 36, as well as robot arms 37 which are movable in a predominantly horizontal plane. Vertical robot arm 36 is connected to pillar 11 of carrier frame 9 via quadrangular construction 33. Operating cylinder 32 is operative between carrier frame 9 and robot arm 36. Since the orientation of robot arm 36 is slightly-adjustable with the aid of lower arm 35 of the quadrangular construction 33, the position of the point of contact of operating cylinder 32 with robot arm 36 is not fully defined spatially. For this reason, the housing of operating cylinder 32 is capable of at least a limited degree of pivoting, on a carrier plate 38 connected to beam 10 of carrier frame 9. Mounted on this carrier plate 38 are supports 39, between which the housing of the operating cylinder 32 can move about a pivot shaft 40.

In the present embodiment, operating cylinder 32 is designed as a servo-pneumatic positioning cylinder. This means that at the lower end of its piston rod 41 a position feedback rod 43 is fitted with a plate 42 connected rigidly thereto. A signal is derived in the portion 57 of the operating cylinder by a potentiometer which indicates the position of piston rod 41 relative to the cylinder housing. With the aid of this signal supplied by the potentiometer, the position of piston rod 41 relative to the cylinder housing can be adjusted to a preset position. Operating cylinder 32 is further provided with an overload protection, whereby, as soon as the animal present in the milking parlor exercises pressure on robot arm construction 31, for example by kicking it with its leg, robot arm construction 31 can be moved to its lowest position. In FIGS. 1 and 2, the milking robot 8 is shown in its rest position, wherein it has been moved as far as possible to the rear relative to frame portions 4 and 5 and wherein robot arm construction 31 has been brought to the lowest possible position near the bottom of parlor 1.

When the cow is present in parlor 1 and the milking process is started, milking robot 8 is moved from its rest position to its start position, i.e. it is adjusted to a position in which the arms of milking robot 8 can be moved under the cow.

In the present embodiment, the milking parlor is provided with arms 44, 45 and 46. Arms 44 and 45 are arranged at a fixed angle of 90° relative to each other. Arms 44 and 45 are therefore moved simultaneously by an operating cylinder 47 which is provided between a supporting plate 48 secured to robot arm 36 and a connecting member 49 arranged between arms 44 and 45. Arms 44 and 45 move in an arc about a predominantly vertical pivot shaft 50 between plate 48 and a further supporting plate 48A, the latter plate also being rigidly connected to robot arm 36, more particularly at its bottom side. With respect to arm 45, arm 46 is movable in an arc about a predominantly vertical pivot shaft 51 by means of an operating cylinder 52, which is arranged between arm 46 and that end of arm 45 located near connecting member 49. Teat cups 53 and 54, which are connectable to the teats of the cow, are provided near the end of arm 46. Arranged between the two teat cups 54 is a slide which is movable along arm 46 and on which there is provided a sensor 55 which by a sector-sequential scanning motion can accurately determine the position of the teats. Operating cylinders 32, 47 and 52 are computer-controlled whereby the teat cups can be properly connected to the cows' teats. When robot arms 44, 45 and 46 have been moved to under the cow in parlor 1, the arms are in a relatively low position, in which the sensor 55 has not yet detected the animal's teats. Using the operating cylinder 32, robot arms 44, 45 and 46 are lifted together step-by-step until sensor 55 detects one or more teats of the animal. Should robot arms 44, 45 and 46 be lifted to such an extent that upper edge of the sensor 55 contacts the cow's abdomen, then a switch 56 on the upper side of sensor 55, causes the robot arms to be lowered. Thereafter, the positional determination of the teats with the aid of the sensor 55 can is repeated by a gradual lifting of the robot arms.

The implement, as described above includes a cleaning device 57 for teat cups 53 and 54. This cleaning device 57 is rigidly connected to downwardly directed pillar 11. Cleaning device 57 incorporates four downwardly directed spray nozzles 58. Each spray nozzle 58 has two separate rinsing liquid ducts 59 and 60. Duct 59 extends centrally through the spray nozzle from top to bottom, and laterally directed first flow-out apertures 61 are provided near the lower end of duct 59. When a teat cup is connected to a corresponding spray nozzle, first flow-out apertures 61 have their discharge ends disposed relatively closely under the upper side of the teat cup. The second duct 60 extends approximately concentrically with respect to first duct 59 in the spray nozzle. At the bottom of second duct 60 is an annular second flow-out aperture 62 which is disposed in a plane perpendicular to the longitudinal axis of the spray nozzle and the test cup connected thereto. First duct 59 of each spray nozzle 58 is connected to a rinsing liquid supply line 63. The second duct 60 of each spray nozzles 59 is connected to a pipe section 64. The pipe sections 64 of individual spray nozzles 59 conjoin a distributor element 65 which is connected to a rinsing liquid supply line 66. Rinsing liquid supply lines 63 are connected via pump to a rinsing liquid reservoir (not shown in the drawings). When the milking robot is not operative for milking, as illustrated in FIG. 1, teat cups 53 and 54 are directly under spray nozzles 58, so that, simply and solely by an upward motion of the robot arm carrying the teat cups, the teat cups engage their corresponding spray nozzles 58. FIG. 2 illustrates the situation in which the robot arms have not yet been moved inboard sufficiently so that the teat cups are positioned directly under the spray nozzles of the cleaning device. When, between milking different animals or after milking of the animals, the teat cups and the milking lines connected thereto must be cleaned, then robot arm 46 together with the teat cups are moved under the spray nozzles and then moved upwardly until the spray nozzles engage the openings of the teat cups. In this position, the first flow-out apertures 61 are disposed almost directly below the upper edge of a teat cup and the second flow-out aperture 62 is almost directly above the upper edge of a teat cup. By thereafter supplying rinsing liquids via lines 63 and 64, one rinsing liquid is discharged over the upper surfaces of the teat cup, while the other rinsing liquid is introduced into the teat cups.

During rinsing, by using a three-way valve which while milking connects the milking lines from the teat cups to a centrally located milk tank, the liquid flow path between the teat cups and the milk tank is interrupted and a fluid passageway for the rinsing liquid is provided to, for example, a rinsing liquid reservoir. Thus, the rinsing liquid can be circulated by means of a pump via supply lines 63, liquid ducts 59 and first flow-out apertures 61 into the teat cups and thereafter conveyed to the reservoir through the milking lines connected to the teat cups. The rinsing liquid that is received by the upper sides of the teat cups via lines 64, duct 60, and second flow-out aperture 62 falls on the floor of parlor 1 and is drained therefrom through a gutter. It is considered important that rinsing liquid supply line 64 not be connected to the rinsing liquid reservoir through which liquid is circulated to the teat cups and relevant milking lines. For cleaning, line 64 can be alternatively connected directly to a water tap or indirectly thereto with an intervening element which adds a special cleaning agent or disinfectant. After rinsing, the rinsing liquid must be flushed from all relevant milk lines.

When the teat cups are connected to the spray nozzles, a vacuum is produced in the teat cups. This causes the teat cups to be drawn slightly upwardly over the lower end of the relevant spray nozzles and the second flow-out apertures 62 in spray nozzles 58 are closed. The spacing between the first flow-out apertures 61 and the second flow-out aperture 62 is therefore relatively small, being, for example, in the range of from five to ten millimeters. In a specific embodiment a spacing of seven millimeters has been selected. When the rinsing liquid is supplied at an increased pressure via pipe section 64 through duct 60, liquid from second flow-out aperture 62 is forced out between the lower edge of second flow-out aperture 62 and the slightly resilient upper side of the relevant teat cup to be sprayed in lateral directions. In that situation, it is advantageous to provide around the cleaning device, or around the individual spray nozzles, a screen 67 which drapes over the upper end of the teat cup when received therein.

Figure 4:
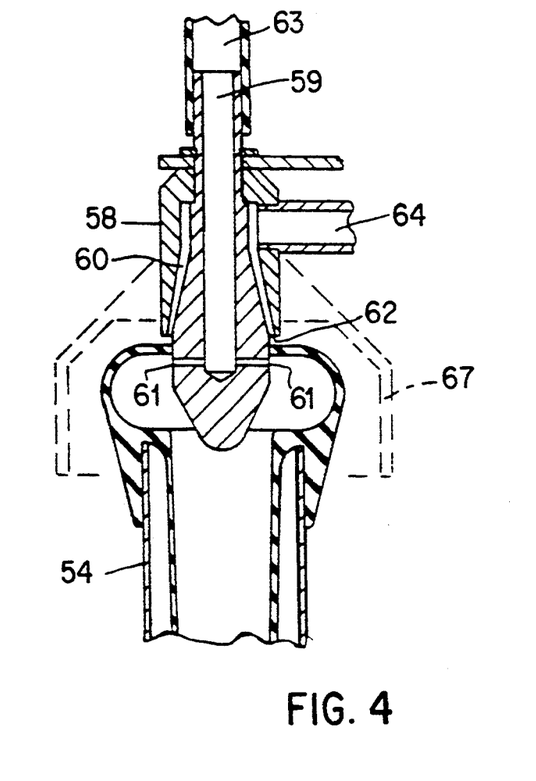
FIG. 4 is a cross-sectional view of a spray nozzle connected to the upper part of a teat cup.
Figure 5:
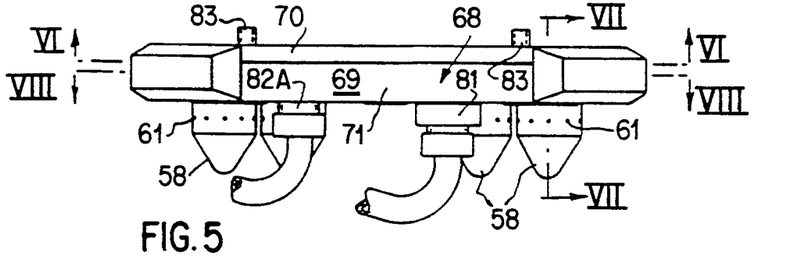
FIG. 5 is a side elevational view of an alternative cleaning device with spray nozzles in accordance with the invention.
Figure 6:
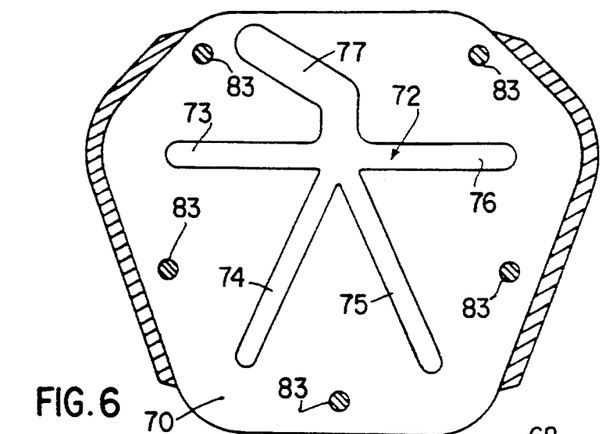
FIG. 6 is a sectional view of a portion of the alternative cleaning device taken on line VI—VI in FIG. 5.
Figures 7, 8:
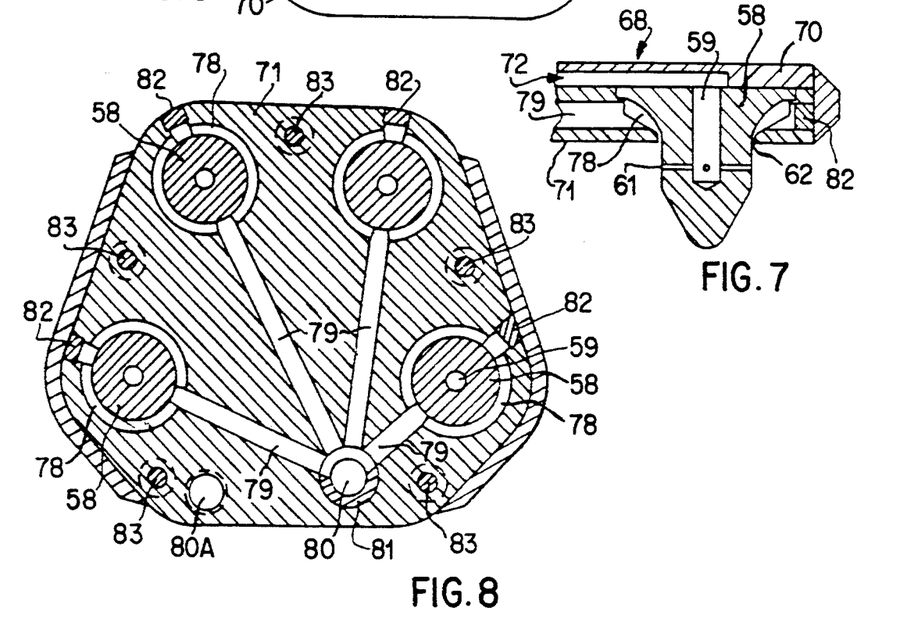
FIG. 7 is a cross-sectional view of a portion of the alternative cleaning device and a spray nozzle taken on line VII—VII in FIG. 5.
FIG. 8 is a sectional view of a portion of the alternative cleaning device taken on line VIII—VIII of FIG. 5.

FIG. 5 illustrates a second embodiment of a cleaning device. This alternative cleaning device 68 includes a carrier plane 69 (See also FIGS. 10, 13 and 15). having thereon four downwardly directed spray nozzles 58. As indicated in FIGS. 4 and 7, each spray nozzle 58 includes two separate rinsing liquid ducts 59 and 60. As described in the preceding embodiment, the rinsing liquid ducts 59 and 60 end in, respectively, lower discharge outlets, referred to herein as the first-flow apertures 61 and an upper discharge outlet referred to herein as the second flow-out aperture 62. In carrier plane 69, spray nozzles 58 are clamped between an upper part comprising a first portion 70 and a lower part comprising a second portion 71. As indicated in FIG. 6, in the surface of first portion 70 there is arranged a first duct system 72. Preferably, first portion 70 is an aluminum plate, in which the pattern of the first duct system has been arranged. The four ducts or channels 73, 74, 75 and 76 of the first duct system 72 connect at their outer ends to the four rinsing liquid ducts 59 of spray nozzles 58. In the second portion 71, a second duct system comprising channel or bores 79 is arranged (FIG. 8). Further, in the second portion 71 of carrier plane 69 there are arranged four downwardly extending openings comprising apertures 78, through which the spray nozzles 58 are received.

In second portion 71, the four bores 79 are arranged on the interior side. Bores 79 are arranged so that each of them extends through the center of an aperture 78 (FIG. 8), and together, opposite apertures 78, they join a first vertical bore 80 which connects to a first nipple 81. Bores 79 are closed along edge of second portion 71 by means of sealing caps 82.

Figure 9:
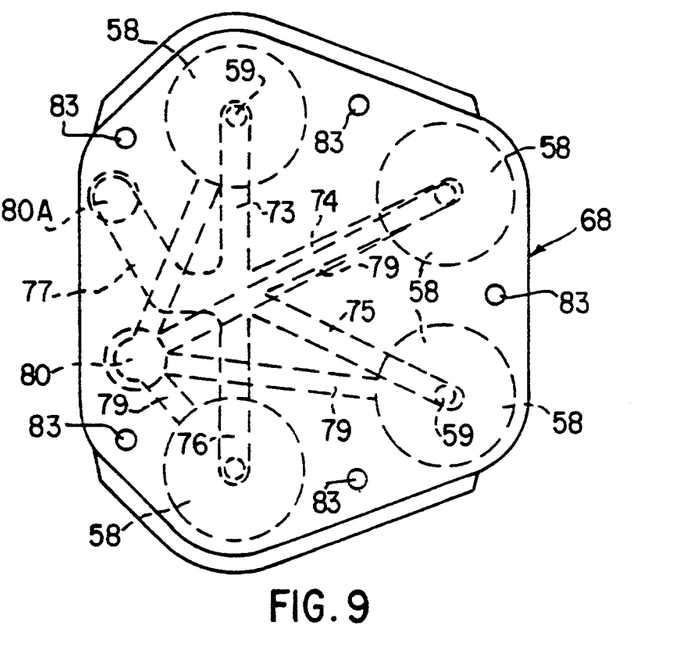
FIG. 9 is a plan view of an alternative embodiment of the cleaning device similar to FIG. 5.

Extending through second portion 71 is a second vertical bore 80A which connects to a second nipple 82A. Bore 80A joins duct system 72 via channel 77. First portion 70 and second portion 71 of carrier plane 69 are clamped firmly together by means of bolts 83, whereby the first portion 70 constitutes a sealing plate closing the upper ends of first and second vertical bores 80 and 80A. Second bore 80A thus provides a fluid passage to first duct system 72 arranged in the first portion 70 and the second portion 71 of the carrier plane 69 constitutes with its surface in the clamped condition a sealing plate for the first duct system 72, including channel 77, arranged in the surface of the first portion 70. FIG. 9 is a plan view of the carrier plane 69 and illustrates how the patterns of the duct system 72 and the second duct system comprising channels 79 are arranged in the two portions 70 and 71.

To obtain a proper sealing of the clamped together portions 70 and 71, it is preferred that the second portion 71 be composed of a relatively soft plastic material and the first portion 70 of aluminum.

Figure 10:
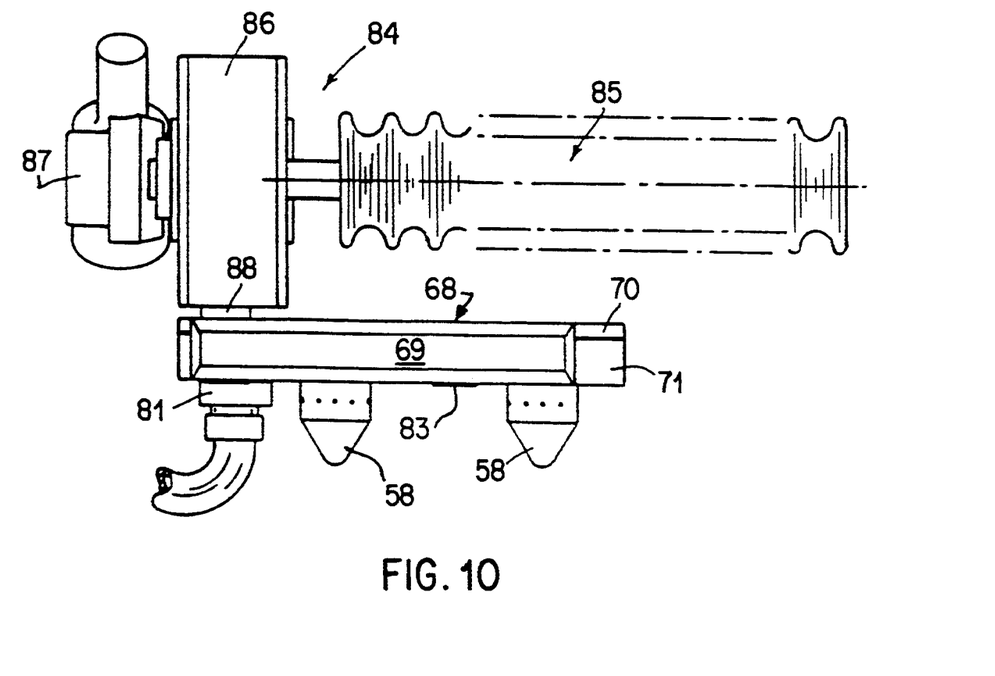
FIG. 10 is a side elevational view of an alternative embodiment of an apparatus according to the invention, which is provided with a cleaning device as well as with a cleaning member for cleaning the teats or the udder or both of an animal to be milked.

In a further embodiment according to FIG. 10, cleaning device 57 includes a cleaning member 84 for cleaning the teats of a milked animal. The cleaning member 84 includes two adjacent cleaning elements in the form of profiled rollers 85, which by their axles are supported rotatably by a gear box 86 which, in turn, is mounted on carrier plane 69. Profiled rollers 85 are driven by an electric motor 87 attached to gear box 86. Cleaning member 84 is bolted together with gear box 86 onto the carrier plane 69 by means of the two bolts 83 which are received through adjacent bores 80 and 80A. Spacer rings 88 are placed between gear box 86 and carrier plane 69 which surround the aforesaid two bolts 83.

Figures 11, 16, 17:
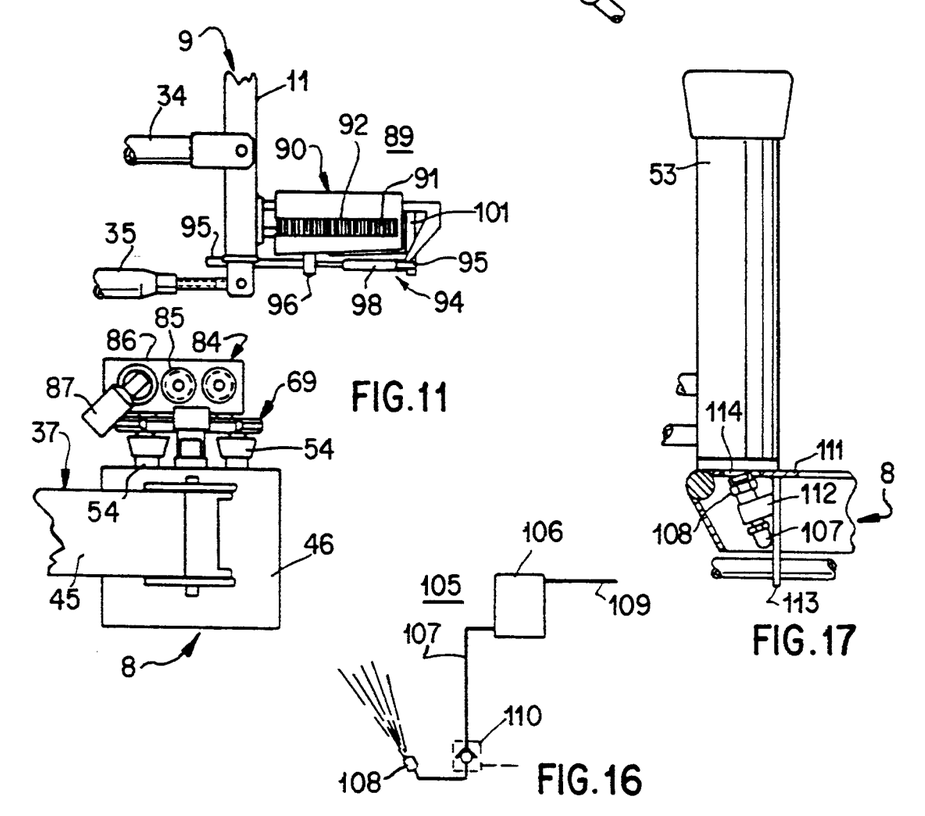
FIG. 11 is an end elevational view of the embodiment of FIG. 10, located on the robot arm of the implement of FIG. 1, as well as cleaning means for cleaning the cleaning member in FIG. 10.
FIG. 16 is a diagram of an after-treatment apparatus for after-treatment of the udder and/or the teats after the milking of an animal, it being indicated schematically how the apparatus is connected.
FIG. 17 is a side elevational sectional view of an after-treatment apparatus according to FIG. 16 incorporated in the embodiment of FIG. 12, to an enlarged scale, taken on line XVII—XVII in FIG. 12.
Figure 12:
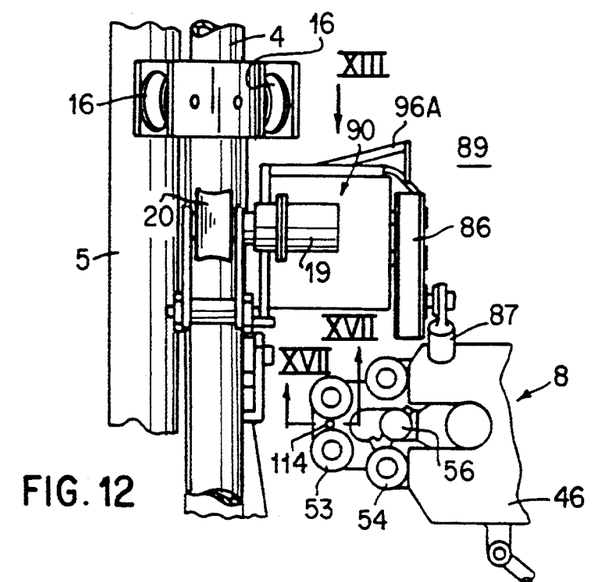
FIG. 12 is a plan view of the embodiment illustrated in FIG. 11.

If it is desirable to clean the teats of the animal to be milked or an animal that has been milked, carrier plane 69 is carried via spray nozzles 58 received in teat cups 53 and 54 by arm 46 of milking robot 8 to the vicinity of the animal's teats (FIG. 11). Here, using sensor 55, the position of the teats of the milking animal is determined so that rollers 85 are moved to contact both sides of one or more of the animal's teats. After such positioning of rollers 85, the teats are engaged between the oppositely rotating profiled rollers, so that they are in contact with the teats, while between rollers 85, sufficiently to ensure that dirt is removed from them.

After so cleaning the teats and possibly rinsing the teat cups, carrier plane 69 is disengaged from robot arm 46 by being removed from the teat cups. Then, the carrier plane 69 is removed and stored in a further carrier (not shown).

The apparatus described above may also be provided with cleaning system 89 for cleaning the cleaning member 84. The cleaning system 89 comprises a box-like housing 90 attached to the beam 11 of carrier frame 9 by means of an L-shaped box-profile bar or strip 93 (FIGS. 11, 13, 14 and 15). Box-like housing 90 has a slot 91 which is covered by a row of brush hairs 92. The width of slot 91 is greater than the diameter of profiled rollers 85. Thus, it is possible to place profiled rollers 85 in box-like housing 90 by movement of robot arm construction 31. To place rollers 85 in box-like housing 90, they must be moved by means of robot arm 46 to a position that is at the level of and in front of slot 91. By moving robot arm 46 in a horizontal plane towards slot 91, the rollers are inserted into box-like housing 90. Gear box 86 and carrier plane 69, however, are retained outside box-like housing 90. FIGS. 12, 13, 14 and 15, illustrate how rollers 85 are moved into the box-like housing 90. Robot arm 46 raises the teat cups along with carrier plane 69, gear box 86, and rollers, 85, to where the ends of rollers 85 are opposite slot 91, and moves then horizontally whereby rollers 85 are received in housing 90 and carrier plane 69 is below it. After rollers 85 have been so positioned in the box-like housing 90, the vacuum in teat cups 53 and 54 is removed, robot arm 46 is disconnected from spray nozzles 58 of carrier plane 69 and is moved therefrom.

Figure 15:
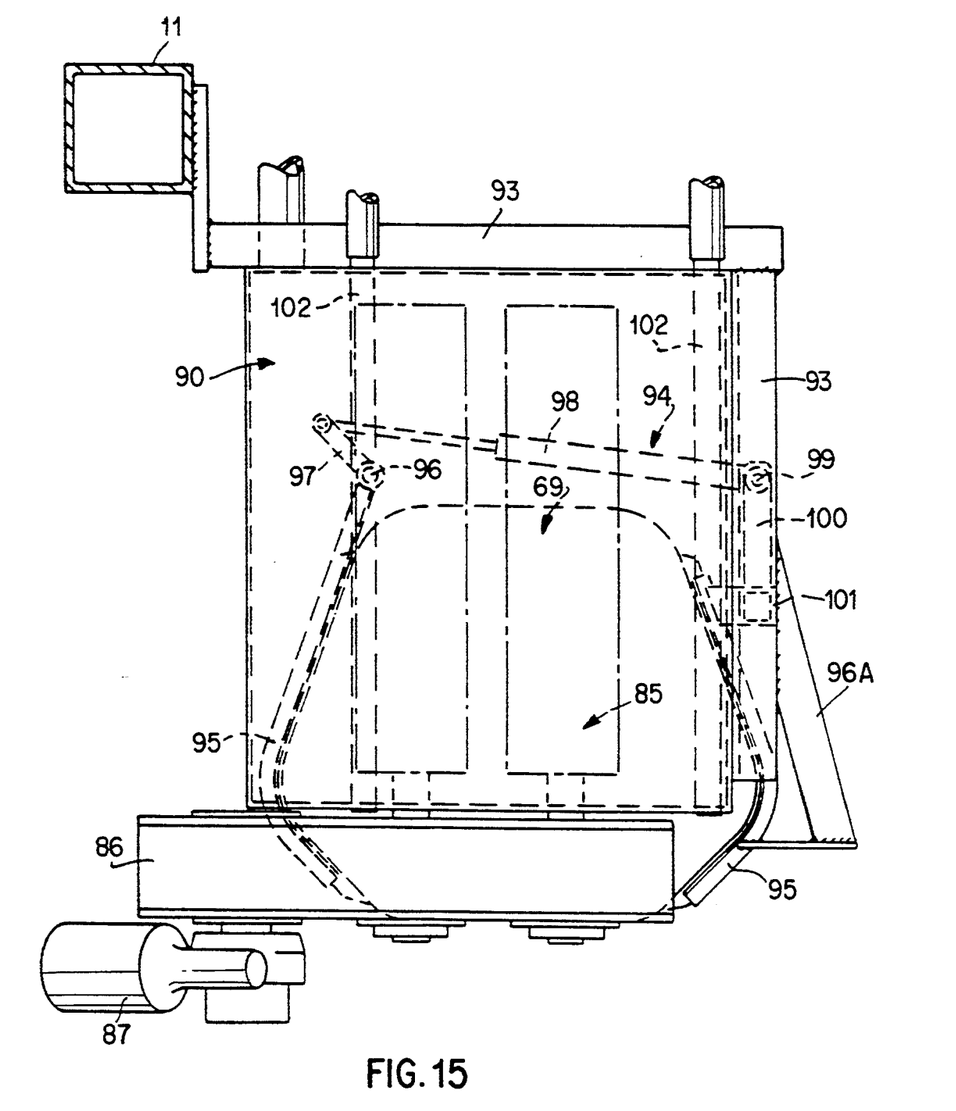
FIG. 15 is a plan view of the embodiment shown in FIG. 13.

Carrier plane 69 is received by a retention and positioning device 94 by means of which carrier plane 69 is secured relative to box-like housing 90. Retention and positioning device 94 includes two rods 95 which are generally U-shaped in cross-section and have generally the same profile as a hockey stick so that they are similar in form to the edges of carrier plane 69. Rods 95 are disposed on either side of carrier plane 69. The first (on the right as seen in FIG. 15) rod 95 is located under the edge and projecting outwardly and forward of box-like housing 90, and is fixedly connected by means of a support 96A to the L-shaped tube 93 which has a rectangular cross-section and is arranged along the side of box-like housing 90. The second bar 95, (on the left as seen in FIG. 15) is below and projecting forwardly of box-like housing 90. This bar 95 is pivotable about a vertical shaft 96 connected to the under side of housing 90. A lever 97 is pivotally connected on its inboard end to vertical shaft 96 and on its outboard end to cylinder 98. Cylinder 98 is pivotally connected at its other end to a vertical shaft 99 which is retained between two horizontal, interspaced bars 100. Bars 100 are affixed to a tube 101 which has a rectangular cross-section and is attached to tube 93.

Figure 13:
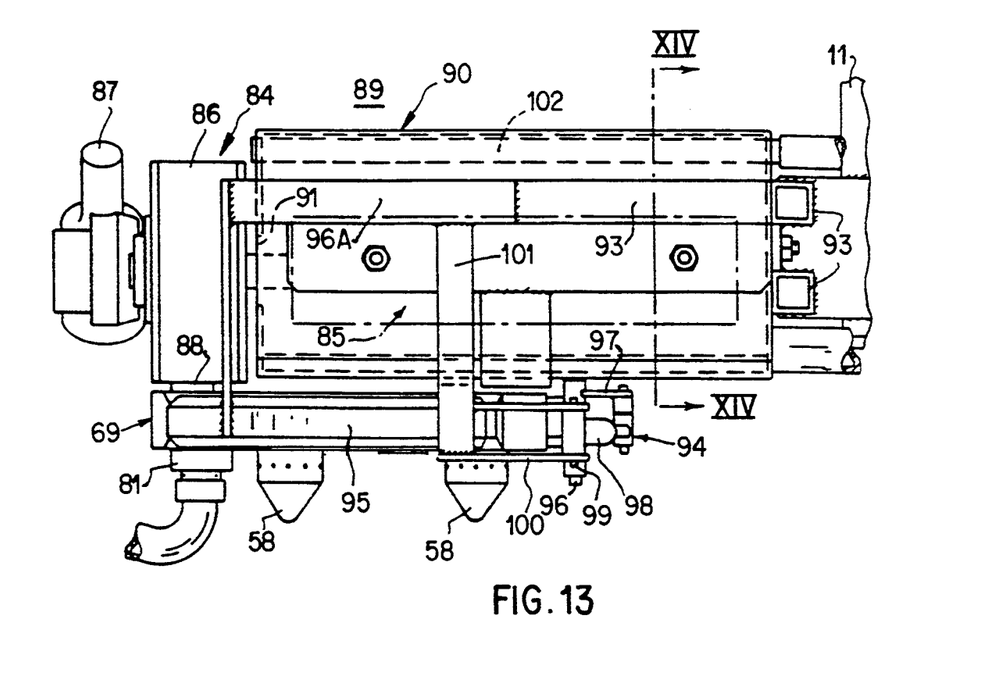
FIG. 13 is a side view as seen in the direction of arrow XIII of a portion of the embodiment shown in FIG. 12.
Figure 14:
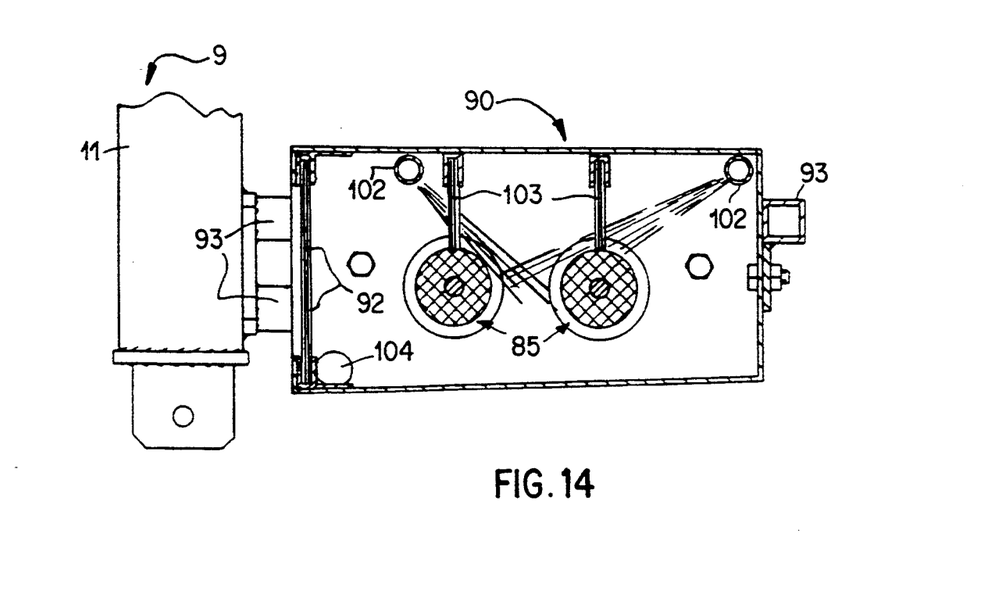
FIG. 14 is a cross-sectional view taken on line XIV—XIV in FIG. 13.

FIGS. 13, 14 and 15 indicate how the carrier plane 69 is held in the box-like housing 90 by means of a retention and positioning device designated generally by reference numeral 94. The carrier plane 69 is held by its edges between rods 95, after energizing cylinder 98. As such, carrier plane 69 is always situated in the same position relative to the box-like housing 90. Carrier plane 69 can be released from rods 95 by energizing the cylinder 98, which causes second rod 95, to which is rigidly connected to lever 97, to pivot in the direction of beam 11 (FIG. 15). After second rod 95 is so pivoted, carrier plane 69 is freely movable in a horizontal plane to permit the removal of rollers 25 from slot 91, by means of robot arm 46 to clean the animals' teats. Preferably, the cylinder 98 is pneumatic.

After the animal's teats have been cleaned by means of profiled rollers 85, the rollers are returned to and stored in box-like housing 90 by the robot arm 46. FIG. 14 shows in cross-section how profiled rollers 85 are located in box-like housing 90. For cleaning profiled rollers 85 there are arranged at the upper sides of box-like housing 90 two spray elements 102. Spray elements 102 include a perforated tube, one end of which is closed and the other is connected to a liquid supply line. A cleaning liquid is supplied to the spray elements 102 through the liquid supply line during the cleaning of profiled rollers 85. The perforations in spray elements 102 are arranged so that the cleaning liquid sprays tangentially against profiled rollers 85. At the upper side of box-like housing 90, above each of profiled rollers 85, a row of depending brush hairs 103 are provided which extend to contact profiled rollers 85. During the cleaning of profiled rollers 85, a cleaning liquid is discharged through spray elements 102 to impinge against rollers 85 that are thus caused to rotate against brush hairs 103. In the lower side of box-like housing 90 is a drain opening 104, to which a discharge line is connected. During cleaning, the cleaning liquid originating from spray elements 102 is drained from housing 90 via this discharge line. Preferably, the bottom of the box-like housing 90 is inclined at an angle so the cleaning liquid flows in the direction of discharge opening 104.

In a further embodiment, according to the invention, the robot arm 46 includes an after-treatment device 105 (FIG. 16) for disinfecting the udder and/or the teats after the animal has been milked. The after-treatment device 105 includes a pressure vessel 106 having stored therein the cleaning and/or disinfecting liquid, and a line 107 leads therefrom which supplies the liquid to a spray nozzle 108 (FIG. 16). A further line 109 is connected to a pressure source through 109 whereby an overpressure is established in pressure vessel 106 of preferably three atmospheres. In supply line 107 to spray nozzle 108 a valve 110 is incorporated by means of which the liquid flow to spray nozzle 108 is selectively closed and opened. Valve 110 may be electromagnetically activated. In a preferred embodiment according to the invention, the valve is arranged near spray nozzle 108, so that the length of the line between the valve 110 and the spray nozzle 108 is relatively short. Therefore, after the valve 110 has been opened, the pressurized liquid in line 107 need only travel a relatively short distance to spray nozzle 108. The advantage of this relatively short travel distance is that, after the valve has been opened, the liquid is sprayed by spray nozzle 108 forms a fan-shape almost immediately. As a result, on opening and closing of valve 110, the occurrences of initial and final discharge phenomena in the production of the fan-shaped spray pattern by the spray nozzle 108 are prevented.

FIG. 17 shows spray nozzle 108 located at the end of robot arm 45 between two front teat cups 53. FIG. 17 indicates how spray nozzle 108 may be advantageously arranged at the end of robot arm 46 of milking robot 8. Spray nozzle 108 is located below the carrier plane 111, on which teat cups 53 rest, and is positioned in a holder 112 connected to a plate 113, which is perpendicular to carrier plane 111. Spray nozzle 108 is positioned in holder 112 so that the fan-shaped spray pattern is directed forwardly and upwardly relative to the end of robot arm 46. In this connection, the fan-shaped spray pattern encompasses, relative to plate 113, an angle of approximately 20°. In carrier plate 111 an aperture is arranged through which the spray liquid of the spray nozzle is sprayed.

The operation of the after-treating device 105 is described hereafter.

After the milking procedure has been terminated, the teat cups 53 are removed from the teats of the animal in parlor 1, and are withdrawn to robot arm 46, where they are supported against carrier plate 111. Subsequently, robot arm 46 is positioned so that the fan-shaped spray pattern from the spray nozzle 108 is received precisely at the rear side at the udder of the milked animal. The positioning of robot arm 46 can be effected by means of the sensor 56 and/or by animal-depending co-ordinates previously supplied to a control computer of robot arm 46. After robot arm 46 has been positioned, valve 110 is opened, while simultaneously the robot arm is moved forwardly in a horizontal plane in the direction of the front side of the animal. Thus, the entire udder is sprayed by the fan-shaped pattern. Because the fan-shaped spray pattern is directed forwardly and upwardly relative to the end of robot arm 46, and because the spraying of the udder is effected from the rear in the direction of the front of the udder, spray liquid originating from the udder and/or the fan shaped spray pattern is prevented from falling into the teat cups. The path to be covered by robot arm 46 in the horizontal plane, and the height of spray nozzle 108 relative to the animal's udder are controlled based on a previous encounter with the animal by a computer controlling the robot arm 46. It is also possible for the appropriate height and the distance to the udder to be determined by sensor 56.

It will be understood that the above-described embodiments of the cleaning device and the after-treating device can be used in an apparatus for automatically milking animals not only in combination, but also separately.

Although we have described the preferred embodiments of our invention, it is to be understood they are capable of other adaptions and modifications within the scope of the following claims.

We claim:

1. A method of automatically cleaning the teat cups of a milking apparatus which comprises the steps of controlling a robot arm automatically to remove the teat cups from the teats of the animal to which they are applied, manipulating said robot arm automatically to interengage said teat cups with a cleaning device, and cleaning said teat cups automatically by means of said cleaning device, the aforesaid steps of removing said teat cups from the animal's teats, interengaging said teat cups with said cleaning device and cleaning said teat cups thereby being automatically accomplished in sequence without human intervention or assistance.

2. A method as claimed in claim 1, wherein said cleaning step comprises introducing rinsing liquid into said teat cups and into the milking lines connected thereto before the milk in said teat cups and said milking lines dries.

3. A method as claimed in claim 1, wherein said cleaning step comprises selectively directing liquid onto the upper side of said teat cups, or into said teat cups and the milking lines connected thereto.

4. A method as claimed in claim 1, wherein said cleaning step comprises applying a rinsing liquid to the upper sides of said teat cups.

5. A method as claimed in claim 1, comprising detecting when a further animal is not within a predetermined time present to be milked by said milking apparatus and wherein said cleaning step further comprises flushing a rinsing liquid through said teat cups and through milking lines connected thereto, when it is detected that said predetermined time has lapsed without a further animal being present to be milked by said milking apparatus.

6. A method as claimed in claim 1, for after-treating the teats of a milked animal, which comprises automatically spraying an after-treatment liquid against the animal's udder and teats after removing said teat cups from the animal's teats.

7. A method as claimed in claim 6, comprising spraying said after-treatment liquid along the length of the animal's udder.

8. A method as claimed in claim 7, comprising spraying said after-treatment liquid in a fan shaped pattern.

9. A method as claimed in claim 7, comprising spraying said after-treatment liquid commencing at the rear side of the animal's udder and moving the spray in the direction of the front side thereof.

10. A method as claimed in claim 6, comprising positioning said robot arm under the animal's udder prior to spraying said after-treatment liquid thereon.

11. An apparatus for milking animals comprising teat cups, means for automatically positioning said teat cups on the animal's teats and removing said teat cups therefrom, a cleaning device comprising a spray nozzle, and interengaging means for effecting a connection of said spray nozzle with said teat cups after said teat cups have been removed from the animal's teats and maintaining said connection while said cleaning device is cleaning said teat cups.

12. An apparatus as claimed in claim 11, wherein said cleaning device comprises a rinsing liquid circuit including said spray nozzles, said spray nozzles receivable into the openings on the upper sides of said teat cups for connection thereto.

13. An apparatus as claimed in claim 12, wherein each of said spray nozzles includes at least one discharge outlet for emitting rinsing liquid over the upper surfaces of said teat cups.

14. An apparatus as claimed in claim 12, wherein each of said spray nozzles includes at least one lower discharge outlet, whereby a rinsing liquid is emitted from said spray nozzles into said teat cups connected to said spray nozzles; each of said spray nozzles further including at least one upper discharge outlet whereby a rinsing liquid is emitted therefrom over the upper surfaces of said teat cups.

15. An apparatus as claimed in claim 14, wherein said spray nozzles include separate ducts for directing the flows of said rinsing liquid to said lower and said upper discharge outlets.

16. An apparatus as claimed in claim 14, wherein each said nozzle includes a substantially vertical longitudinal axis which coincides with the longitudinal axis of the corresponding said teat cup when connected thereto, said upper discharge outlet positioned in a plane perpendicular to said longitudinal axis of said spray nozzle and the teat cup connected thereto.

17. An apparatus as claimed in claim 14, wherein said upper discharge outlet is arranged and constructed in said spray nozzle so that a vacuum applied in the space for receiving an animal's teat in a teat cup connected to said nozzle urges said teat cup upwardly and closes said upper discharge outlet.

18. An apparatus as claimed in claim 14, wherein said lower discharge outlet is arranged and constructed in said spray nozzle so that said lower discharge outlet is located directly below the upper edge of said teat cup when said teat cup is connected to said spray nozzle.

19. An apparatus as claimed in claim 14, wherein the spacing between said lower and said upper discharge outlets is in the range of about five to about ten millimeters.

20. An apparatus as claimed in claim 14, wherein a screen is mounted around the periphery of each said spray nozzles, said screen surrounding the upper end of the corresponding said teat cup.

21. An apparatus as claimed in claim 12, wherein said cleaning device further comprises a carrier element, said spray nozzles being connected thereto.

22. An apparatus as claimed in claim 21, wherein said carrier element includes ducts through which said rinsing liquid is delivered to said spray nozzles.

23. An apparatus as claimed in claim 21, wherein said carrier element includes a first duct system through which said rinsing liquid is delivered to said lower discharge outlet of said spray nozzle.

24. An apparatus as claimed in claim 23, wherein said carrier comprises a least two superimposed parts comprising a first part and a second part, said first duct system comprising a pattern of channels in the surface of said first part.

25. An apparatus as claimed in claim 21, wherein said carrier element includes a second duct system through which said rinsing liquid is delivered to said upper discharge outlet of said spray nozzle.

26. An apparatus as claimed in claim 25, wherein said carrier element comprises at least two superimposed parts comprising a first part and a second part, said second duct system comprising a pattern of channels in said second part.

27. An apparatus as claimed in claim 11, comprising a milking robot having a robot arm, wherein said cleaning device is associated with said milking robot and said teat cups are mounted on said robot arm.

28. An apparatus as claimed in claim 27, wherein said cleaning device is coupled to said milking robot, said robot arm being automatically movable into and away from an operative position for milking, said teat cups mounted on said robot arm being connected to said cleaning device when said robot arm is moved in an upward direction from a non-operative position for milking.

29. An apparatus as claimed in claim 11, wherein said cleaning device is associated with a cleaning member for cleaning the teats of the animal that is milked.

30. An apparatus as claimed in claim 29, comprising cleaning means for cleaning said cleaning member.

31. An apparatus as claimed in claim 30, wherein said cleaning means comprises a box-like housing, said box-like housing including a slot which is constructed and arranged so that said cleaning member can be inserted therein.

32. An apparatus as claimed in claim 31, comprising a covering means for said slot for preventing foreign matter from being received in said box-like housing.

33. An apparatus as claimed in claim 32, wherein said covering means comprises a row of brush hairs.

34. An apparatus as claimed in claim 31, wherein said box-like housing includes at least one rinsing member through which a rinsing liquid is received inside of said box-like housing.

35. An apparatus as claimed in claim 34, wherein said rinsing liquid is received in said box-like housing through at least one brush.

36. An apparatus as claimed in claim 31, wherein said box-like housing includes a positioning means for positioning said cleaning device and said cleaning member in a predetermined positions relative to said box-like housing.

37. An apparatus as claimed in claim 11, comprising a fixed frame which includes an upper frame portion and a lower frame portion, the apparatus further comprising:
- a milking robot movably coupled to said upper frame portion and resting against said lower frame portion, said milking robot including said interengaging means which is movable under the animal to be milked;
- a carrier frame movable along said upper frame portion;
- said cleaning device secured to said carrier frame.

38. An apparatus as claimed in claim 37, wherein said interengaging means comprises a robot arm, said robot arm having said teat cups attached thereto, whereby when said robot arm is not in an operative position for milking, said teat cups can be connected to said cleaning device by means of said robot arm being moved upwardly.

39. An apparatus as claimed in claim 38, wherein said robot arm comprises an after-treatment device for treating the animal's udder and teats.

40. An apparatus as claimed in claim 11, comprising positioning means for selectively disposing said teat cups for being received by the animal's teats which also disposes said teat cups to be connected to said spray nozzles of said cleaning device.

41. An apparatus as claimed in claim 11, comprising an after-treatment device for automatically treating the animal's udder and teats.

42. An apparatus as claimed in claim 41, wherein said after-treatment device further comprises a spray nozzle member coupled to a supply line, said supply line being interfaced with a valve.

43. An apparatus as claimed in claim 42, wherein said valve is positioned proximate to said spray nozzle member.

44. An apparatus as claimed in claim 42, comprising a milking robot arm, wherein said spray nozzle member is mounted on said milking robot arm.

45. An apparatus as claimed in claim 44, wherein said spray nozzle member is between two said teat cups which are positioned proximate the end of said milking robot arm.

46. An apparatus as claimed in claim 45, wherein said spray nozzle member is positioned under a carrier plane of said milking robot arm, said carrier plane providing support for said teat cups.

47. An apparatus as claimed in claim 44, wherein said spray nozzle member is constructed and arranged to produce a forwardly and upwardly directed fan-shaped spray pattern of fluid emitted therefrom.

48. An apparatus as claimed in claim 47, wherein said fan-shaped spray pattern extends at an angle of about 10° to 50° relative to a vertical plane through the forward two of said teat cups.

49. An apparatus as claimed in claim 41, wherein said after-treatment device is operatively connected to a source of an after-treatment liquid containing a disinfectant agent.

* * * * *